United States Patent
Vakil

(10) Patent No.: US 11,773,215 B2
(45) Date of Patent: Oct. 3, 2023

(54) POLYPROPIOLACTONE FILMS, AND METHODS OF PRODUCING THEREOF

(71) Applicant: Novomer, Inc., Rochester, NY (US)

(72) Inventor: Utpal Mahendra Vakil, Evansville, IN (US)

(73) Assignee: Novomer, Inc., Rochester, NY (US)

( * ) Notice: Subject to any disclaimer, the term of this patent is extended or adjusted under 35 U.S.C. 154(b) by 482 days.

(21) Appl. No.: 16/970,736

(22) PCT Filed: Apr. 1, 2019

(86) PCT No.: PCT/US2019/025184
§ 371 (c)(1),
(2) Date: Aug. 18, 2020

(87) PCT Pub. No.: WO2019/195168
PCT Pub. Date: Oct. 10, 2019

(65) Prior Publication Data
US 2020/0369825 A1   Nov. 26, 2020

Related U.S. Application Data

(60) Provisional application No. 62/654,197, filed on Apr. 6, 2018.

(51) Int. Cl.
| | |
|---|---|
| *C08G 63/08* | (2006.01) |
| *B29C 48/285* | (2019.01) |
| *B29C 48/00* | (2019.01) |
| *C08J 5/18* | (2006.01) |
| *C08J 11/12* | (2006.01) |
| *B29K 67/00* | (2006.01) |

(52) U.S. Cl.
CPC .......... *C08G 63/08* (2013.01); *B29C 48/0018* (2019.02); *B29C 48/288* (2019.02); *C08J 5/18* (2013.01); *C08J 11/12* (2013.01); *B29K 2067/04* (2013.01); *B29K 2995/004* (2013.01); *B29K 2995/006* (2013.01); *B29K 2995/0077* (2013.01); *B29K 2995/0088* (2013.01); *C08J 2367/04* (2013.01)

(58) Field of Classification Search
USPC ......................................................... 521/48
See application file for complete search history.

(56) References Cited

U.S. PATENT DOCUMENTS

| | | | |
|---|---|---|---|
| 5,180,765 A | 1/1993 | Sinclair | |
| 5,882,787 A | 3/1999 | Claeys et al. | |
| 2003/0166779 A1 | 9/2003 | Khemani et al. | |
| 2009/0306299 A1 | 12/2009 | Kipke et al. | |
| 2012/0065342 A1 | 3/2012 | Hamaguchi et al. | |
| 2013/0165690 A1* | 6/2013 | Fauconet | C07C 51/16 562/598 |
| 2017/0232640 A1 | 8/2017 | Hollar, Jr. et al. | |
| 2018/0094100 A1 | 4/2018 | Farmer et al. | |

FOREIGN PATENT DOCUMENTS

| | | | | |
|---|---|---|---|---|
| CN | 105903090 A | 8/2016 | | |
| EP | 0750015 A2 | 12/1996 | | |
| FR | 2953829 A1 * | 6/2011 | ............ | C07C 45/52 |
| FR | 3017617 A1 * | 8/2015 | ............ | C07C 45/52 |
| JP | H06313063 A | 11/1994 | | |
| JP | H11-268751 A | 10/1999 | | |
| JP | H11268751 A | 10/1999 | | |
| JP | 2000238194 A | 9/2000 | | |
| JP | 2011526317 A | 10/2011 | | |
| JP | 2015057385 A1 * | 3/2015 | ........... | C07C 51/377 |
| JP | 2018052955 A | 4/2018 | | |
| WO | WO-2008134503 A1 * | 11/2008 | ............ | C08L 53/02 |
| WO | 2010000638 A1 | 1/2010 | | |
| WO | 2010147176 A1 | 12/2010 | | |
| WO | 2013126375 A1 | 8/2013 | | |
| WO | 2020014466 A1 | 1/2020 | | |

OTHER PUBLICATIONS

JP-2015057385 A1 Machine Translation by Lensbouer (Year: 2015).*
FR-3017617-A1 Machine Translation ; J. Debaux (Year: 2015).*
FR-2953829-A1 Machine Translation ; J. Debaux (Year: 2011).*
International Search Report and Written Opinion for PCT/US2019/025184 dated May 24, 2019.
Extended European Search Report in co-pending European Patent Application No. 19782143.2 dated Oct. 18, 2021 (11 pages).
First Office Action in co-pending Application No. JP2020-543848 dated Jan. 31, 2023 (with English translation).

* cited by examiner

*Primary Examiner* — Terressa Boykin
(74) *Attorney, Agent, or Firm* — Young Basile Hanlon & MacFarlane, P.C.

(57) ABSTRACT

Provided is a method of producing a film by cryogenically grinding polypropiolactone to form a powder, and extruding the powder to form the film. Provided herein are also polypropiolactone films having certain biocontent and compostability, as well as certain mechanical and physical properties. Such films may also be suitable for use as packaging materials.

20 Claims, No Drawings

POLYPROPIOLACTONE FILMS, AND METHODS OF PRODUCING THEREOF

CROSS-REFERENCE TO RELATED APPLICATIONS

This application is a National Stage Filing under 35 USC 371 of the PCT Application No. PCT/US2019/025184 Apr. 1, 2019, published as WO2019/195168, which claims priority from U.S. Provisional Application No. 62/654,197 filed Apr. 6, 2018, both of which are incorporated herein by reference in their entirety for all purposes.

FIELD

The present disclosure relates generally to polymeric films, and more specifically to polypropiolactone (PPL) films that may be derived from a bio-source. Such PPL films may be suitable for use in various applications, including, for example, packaging applications.

BACKGROUND

Conventional polyolefin films are commonly used in many applications. There are many disadvantages in the use of conventional polyolefin films. For instance, conventional polyolefin films are generally not reusable and/or recyclable. Furthermore, the production of conventional polyolefin films requires high temperatures, resulting in a high specific energy consumption process which can be undesirable on scale.

Thus there remains a need in the art for the development of new films as replacements for conventional polyolefin films, preferably films that are reusable, recyclable, and that can be produced more economically on industrial scale.

BRIEF SUMMARY

Provided herein are methods of producing polypropiolactone (PPL) films. The resulting films have numerous benefits over conventional polyolefin films. For example, in some variations, the films produced according to the methods herein may undergo extrusion (including, for example, blown film extrusion) at temperatures below that of conventional films with little thermal degradation. The films resulting from the methods herein may also be reusable and/or recyclable.

In some aspects, provided is a method of producing a film, comprising cryogenically grinding PPL to form a powder; and extruding the powder to form the film. In some variations, the cryogenically grinding of PPL may involve cryogenically cooling PPL followed by grinding of the cooled PPL.

In some variations of the method, the extruding is performed at a temperature between about 80° C. to about 160° C. In other variations, the powder may undergo melt extrusion, cast extrusion, or blow film extrusion, or any combination thereof, to produce the film.

In other aspects, provided is a method of producing a film, comprising blending a mixture of PPL polymers; and blowing the mixture to form the film. In one variation, the mixture of PPL polymers comprises two or more PPL polymers having different average molecular weight ($M_w$).

In another aspect, provided is a film produced according to any of the methods described herein. In some variations where the PPL is obtained from a renewable feedstock, the resulting film may have a biocontent of at least 60% (w/w) and/or the resulting film may be compostable up to 100%.

The films described herein may be used as, or further processed into, packaging materials. Such packaging materials may include, for example, shrink wrap.

In yet other aspects, provided is a method of producing acrylic acid, comprising providing a film according to any of the methods described herein; and thermolyzing at least a portion of the film to produce acrylic acid.

DETAILED DESCRIPTION

The following description sets forth exemplary methods, parameters and the like. It should be recognized, however, that such description is not intended as a limitation on the scope of the present disclosure but is instead provided as a description of exemplary embodiments.

In some aspects, provided is a method of producing a film. In some embodiments, the film may be produced by cryogenically grinding polypropiolactone (PPL) to form a powder, and extruding the powder to form the film. In certain aspects, provided is also a film produced according to any of the methods described herein. In some variations, the PPL used to produce the film may be obtained from a bio-source, thereby leading the film produced to be bio-sourced as well. In other variations, the resulting film may also be compostable.

The methods and materials used to produce such film, and the properties of the film are described in further detail below.

Methods of Producing the Film

In some aspects, provided is a method of producing a film, comprising cryogenically grinding polypropiolactone (PPL) to form a powder, and extruding the powder to form the film.

PPL

In some embodiments, the PPL is a medium molecular weight PPL (MMW PPL). In other embodiments, the PPL is a high molecular weight PPL (HMW PPL).

In some variations, the PPL has an average molecular weight ($M_w$) between about 100,000 g/mol and about 200,000 g/mol. In some variations, the PPL has an average molecular weight ($M_w$) between about 120,000 g/mol and about 150,000 g/mol. In other variations, the PPL has an average molecular weight ($M_w$) between about 800,000 g/mol to about 1,000,000 g/mol.

The PPL used may be obtained from commercially available sources, or produced according to any methods known in the art. In some variations, the PPL may be obtained by polymerizing the BPL to form the PPL. In certain variations, the PPL may be obtained by: reacting ethylene oxide with carbon monoxide in the presence of a carbonylation catalyst to form BPL, and polymerizing the BPL to form the PPL. In another variation, the PPL may be obtained by carbonylating ethylene oxide to form BPL, and polymerizing the BPL to form the PPL.

The PPL used may also be obtained from renewable feedstock. For example, when the PPL is produced from ethylene oxide and carbon monoxide, either or both the ethylene oxide and carbon monoxide may be obtained from renewable feedstock using methods known in the art. When the PPL is obtained in part or completely from renewable feedstock, the PPL produced from such BPL has a biocontent greater than 0% (w/w). Various techniques are known in the art to determine biocontent of a material. For example, in some variations, biocontent of a material may be measured using the ASTM D6866 method, which allows the determination of the biocontent of materials using radiocarbon analysis by accelerator mass spectrometry, liquid scintillation counting, and isotope mass spectrometry. A biocontent result may be derived by assigning 100% equal to 107.5 pMC (percent modern carbon) and 0% equal to 0 pMC. For example, a sample measuring 99 pMC will give an equivalent biocontent result of 93%. In one variation, biocontent may be determined in accordance with ASTM D6866 revision 12 (i.e., ASTM D6866-12). In another variation, biocontent may be determined in accordance with the procedures of Method B of ASTM-D6866-12. Other techniques for assessing the biocontent of materials are described in U.S. Pat. Nos. 3,885,155, 4,427,884, 4,973,841, 5,438,194, and 5,661,299, as well as WO2009/155086.

Production of the PPL Powder

In the methods described herein, the PPL may be cryogenically ground to form a PPL powder. The cryogenic grinding of PPL can occur as a single step or as two steps.

In some embodiments, the cryogenic grinding of PPL involves cryogenic cooling and grinding the PPL in a single step. In some variations, the PPL is cryogenically ground at a temperature between about −50° C. to about −300° C.; between about −50° C. and about −275° C.; between about −50° C. and about −150° C.; between about −100° C. and about −200° C.; or between about −125° C. and about −150° C. In some variations, combining the cryogenic cooling of the PPL and the grinding of the PPL into a single step may lead to improved blending properties of the PPL powder. In certain variations, combining the cryogenic cooling of the PPL and the grinding of the PPL into a single step may yield a film that is produced with little thermal degradation.

In other embodiments, the cryogenic grinding of the PPL occurs in two steps. PPL is first cryogenically cooled, and then the cryogenically cooled PPL is ground to form the powder. In some variations, the PPL is cryogenically cooled to a temperature between about −50° C. and about −275° C.; between about −50° C. and about −150° C.; between about −100° C. and about −200° C.; or between about −125° C. and about −150° C.

Properties of the PPL Powder

In some embodiments, the powder comprises particles of ground PPL. In some embodiments, the powder comprises particles of finely ground PPL. In some embodiments, the powder comprises particles of finely ground PPL of substantially uniform size. In some embodiments, the powder comprises particles having a particle size between about 300 μm and about 3,000 μm; between about 500 μm to about 2,000 μm; or between about 700 μm to about 1,000 μm.

In certain variations, using a powder comprising particles of finely ground PPL may result in better mixing of the powder. In certain variations, using a powder comprising particles of finely ground PPL may help in better feeding of the powder into an extruder.

The powder produced from the cryogenic grinding of PPL has a specific bulk density. In some embodiments, the powder has a bulk density suitable for feeding into an extruder.

Production of the PPL Film

In the methods described herein, the powder produced by cryogenically grinding PPL is extruded to produce a film. Various extrusion techniques may be employed to produce the film. In some embodiments, melt extrusion, cast extrusion, or blow film extrusion may be employed.

The temperature at which the extrusion is performed may vary depending on the extrusion technique used. For example, in some variations where melt extrusion is employed, the extruding is performed at a temperature range between about 80° C. to about 160° C.

In some variations, provided is a method comprising cryogenically grinding polypropiolactone (PPL) to form a powder; feeding the powder into an extruder; and processing the powder in the extruder to form the film. In some variations, the processing the powder in the extruder comprises melting the powder to form a PPL melt.

In some embodiments, the extruder has a feed temperature of about 10° C. In other embodiments, the extruder has a barrel temperature between about 50° C. and about 170° C.; or between about 50° C. and about 110° C. In yet other embodiments, the extruder has a die temperature of between about 110° C. and about 170° C.; or a die temperature of about 110° C. or about 170° C. In yet other embodiments, the extruder has a film die temperature of between about 110° C. and about 166° C.; or a film die temperature of about 110° C., about 160° C., or about 160° C.

Various extruders may be employed in the methods described herein. In some variations, a melt extruder, a parallel twin screw extruder, or an extruder comprising a slit die may be used.

In certain variations, the PPL melt undergoes minimal thermal decomposition under the extrusion conditions described herein. In one variation, the PPL melt undergoes minimal thermolysis, which would yield acrylic acid, under the extrusion conditions described herein. In one variation, the PPL melt has less than 5%, less than 4%, less than 3%, less than 2%, or less than 1% by weight of acrylic acid. In another variation, less than 5%, less than 4%, less than 3%, less than 2%, or less than 1% by weight of acrylic acid is detected in the PPL melt.

Other Methods

In other variations, the powder may be blow molded to produce large diameter and/or width films that may be suitable for use in bulk packaging applications. For example, in one aspect, provided is a method of producing a film, comprising cryogenically grinding PPL to form a powder, and blow molding the powder to form the film.

In other aspects, provided is a method of producing a film, comprising blending a mixture of PPL polymers; and blowing the mixture to form the film. In some embodiments, the mixture of PPL polymers comprise two or more, three or more, four or more, or five or more PPL polymers having different average molecular weight ($M_w$). In some variations, the mixture of PPL polymers comprises two, three or four PPL polymers having different average molecular weight ($M_w$).

In some embodiments, at least one of the PPL polymers is a medium molecular weight PPL (MMW PPL). In other embodiments, at least one of the PPL polymers is a high molecular weight PPL (HMW PPL). In some variations, at least one of the PPL polymers has an average molecular weight ($M_w$) between about 100,000 g/mol and about 200,000 g/mol. In some variations, at least one of the PPL polymers has an average molecular weight ($M_w$) between about 120,000 g/mol and about 150,000 g/mol. In other variations, at least one of the PPL polymers has an average molecular weight ($M_w$) between about 800,000 g/mol to about 1,000,000 g/mol.

In one aspect, provided is a film produced according to the foregoing methods. In one variation, the film produced is multilayered.

The PPL Film

In certain aspects, provided is a film produced according to any of the methods described herein. In other aspects, provided is a PPL film that has a certain biocontent and compostability, as well as certain mechanical and physical properties.

Biocontent

The film produced according to the methods described herein may be obtained from renewable feedstock. For example, when the PPL used is obtained in part or completely from renewable feedstock, the PPL film produced from such PPL has a biocontent greater than 0% (w/w). As described above, various techniques are known in the art to determine biocontent of a material.

In some embodiments, the film has a biocontent of at least 10% (w/w), at least 20% (w/w), at least 30% (w/w), at least 40% (w/w), at least 50% (w/w), at least 60% (w/w), at least 70% (w/w), at least 80% (w/w), at least 90% (w/w), at least 95% (w/w), at least 96% (w/w), at least 97% (w/w), at least 98% (w/w), at least 99% (w/w), at least 99.5% (w/w), at least 99.9% (w/w), at least 99.99% (w/w), or 100% (w/w); or between about 80% (w/w) and about 100% (w/w), between about 90% (w/w) and about 100% (w/w), or between about 95% (w/w) and about 100% (w/w).

Compostability

In some embodiments, the film produced according to the methods herein has compostability characteristics that are superior to conventional films, including conventional polyolefin films.

In some variations, the film may be compostable up to 10%, up to 20%, up to 30%, up to 40%, up to 50%, up to 60%, up to 70%, up to 80%, up to 90%, or up to 100%; or between about 80% and about 100%, between about 90% and about 100%, or between about 95% and about 100%.

Film Properties

In some embodiments, the film has a tensile modulus between about 800 MPa and 1100 MPa; or between about 835 MPa and about 1065 MPa. In other embodiments, the film has a tensile modulus between about 0.5 GPa and about 3.6 GPa; between about 1 GPa and 1.5 GPa, or between about 1 GPa and 1.1 GPa.

In some embodiments, the film has a tensile strength at break between about 20 MPa and about 35 MPa; or between about 25 MPa and about 35 MPa. In other embodiments, the film has a tensile strength at break between about 5 MPa and about 50 MPa; between about 10 MPa and 40 MPa; or between about 20 MPa and about 30 MPa.

In some embodiments, the film has an elongation at break between about 300% and 800%; between about 400% and about 700%; or between about 440% and about 660%. In other embodiments, the film has an elongation at break between about 0.1% and 1000%; between about 50% and 700%; between about 100% and 700%; between about 200% and 600%; between about 500% and 700%; or between about 600% and about 700%.

In some embodiments, the film has a glass transition temperature ($T_g$) between about −150° C. and about 70° C.; between about −50° C. and about 0° C.; or between about −30° C. and about −10° C.; or about −20° C.

In other embodiments, the film has a melt temperature ($T_m$) between about 50° C. and about 180° C.; between about 60° C. and about 150° C.; between about 70° C. and 100° C.; or between about 70° C. and about 80° C.

In yet other embodiments, the film has up to about 50% crystallinity. In one variation, crystallinity is measured by Differential Scanning Calorimetry.

In some variations, the film is uniform.

In other variations, the film is multilayered.

It is understood that any property of PPL film described herein may be combined the same as if each and every combination were individually listed. For example, in some embodiments, provided is a film having: (a) a biocontent of at least 90%; (b) a tensile modulus between about 835 MPa and about 1065 MPa, (c) a tensile strength at break range between about 25 MPa and about 35 MPa, or (d) an elongation at break range of about 440% to about 660%, or any combination of (a)-(d).

It should be understood that reference to "about" a value or parameter herein includes (and describes) embodiments that are directed to that value or parameter per se. For example, description referring to "about x" includes description of "x" per se. In other instances, the term "about" when used in association with other measurements, or used to modify a value, a unit, a constant, or a range of values, refers to variations of +/−10%.

It should also be understood that reference to "between" two values or parameters herein includes (and describes) embodiments that include those two values or parameters per se. For example, description referring to "between x and y" includes description of "x" and "y" per se.

Uses of the PPL Film

Packaging

The PPL film described herein may be recyclable and/or reusable, and may be suitable for use in various applications. For example, in some variations, the PPL film may be used in packaging (e.g., in packaging manufactured goods). For example, in one variation, the film is used as, or further processed into, packaging material. In other embodiments, the film is used as shrink wrap. Such film may be a recyclable shrink wrap.

Producing of Acrylic Acid

In some embodiments, the film may undergo thermolysis to produce acrylic acid. For example, after the film is used as a packaging material, such packaging material may be used to produce acrylic acid.

In one aspect, provided is a method of producing acrylic acid, comprising: producing a film according to any of the methods described herein; and thermolyzing the film to produce acrylic acid.

EXAMPLES

The following Examples are merely illustrative and are not meant to limit any aspects of the present disclosure in any way.

Example 1

Production and Characterization of Two Grades of Polypropiolactone (PPL) Films This example demonstrates the production of films from medium and high molecular weight PPL.

One film was produced from medium molecular weight PPL, and another film was produced from high molecular weight PPL according to the following general procedure. PPL was cryogenically ground to obtain a powder of desired bulk density, suitable for feeding into an extruder. Both lots of PPL powder were melt extruded into films using a parallel twin screw extruder in separate extrusion trials. Processing temperatures for PPL vary from 80° C. to 160° C., which is generally much lower than other thermoplastic resins used in film applications. Such processing temperatures can lead to significant savings in energy in commercial production. During extrusion, there was no acrylic acid odor detected, thus suggesting there was no apparent thermal degradation of the PPL during the extrusion process.

Representative extruder temperature profiles for extruding the two different grades of PPL films as described in this example are as follows:

Medium molecular weight PPL:

| Zone # | 1 | 2 | 3 | 4 | 5 | 6 | 7 | 8 | 9 |
|---|---|---|---|---|---|---|---|---|---|
| | Feed | ← extruder barrels → | | | | | | Die#1 | Film Die |
| Temp(° C.) | 10 | 50 | 80 | 110 | 110 | 110 | 110 | 110 | 110 |

High molecular weight PPL:

| Zone # | 1 | 2 | 3 | 4 | 5 | 6 | 7 | 8 | 9 |
|---|---|---|---|---|---|---|---|---|---|
| | Feed | ← extruder barrels → | | | | | | Die#1 | Film die |
| Temp(° C.) | 10 | 50 | 80 | 170 | 170 | 170 | 170 | 165 | 160 |

After extrusion, both films produced were observed to be uniform and exhibit mechanical properties as summarized in Table 1 below.

TABLE 1

Mechanical Properties

| Property | MMW PPL | HMW PPL |
|---|---|---|
| Tensile Modulus (MPa) | 1065 | 835 |
| Tensile Strength @ break (MPa) | 25 | 31 |
| Elongation @ break (%) | 660 | 440 |

MMW PPL refers to the PPL film prepared from the medium molecular weight PPL

HMW PPL refers to the PPL film prepared from the high molecular weight PPL

Example 2

Production and Characterization of Polypropiolactone (PPL) Film

In this example, a PPL film was produced in general accordance with the procedure set forth in Example 1 above. PPL was melt extruded to produce a film having the following properties summarized in Table 2 below.

TABLE 2

Properties of Melt Extruded Film Obtained from PPL

| Polymer | Tensile Strength (MPa) | Elongation at break (%) | Modulus (GPa) | $T_g$ (° C.) | $T_m$ (° C.) |
|---|---|---|---|---|---|
| Melt Extruded Film | 25 ± 2 | 660 ± 50 | 1.07 ± 0.06 | −20 | 77 |

What is claimed is:

1. A method of producing a film, comprising:
   blending a mixture of polypropiolactone polymers having different average molecular weights; and
   blowing the mixture to form the film.

2. The method of claim 1, wherein at least one of the polypropiolactone polymers in the mixture of the polypropiolactone polymers has an average molecular weight ($M_w$) between about 100,000 g/mol and about 200,000 g/mol.

3. The method of claim 1, wherein at least one of the polypropiolactone polymers in the mixture of the polypropiolactone polymers has an average molecular weight ($M_w$) between about 800,000 g/mol to about 1,000,000 g/mol.

4. The method of claim 1, wherein the film is multilayered.

5. A film produced according to the method of claim 1.

6. A film, comprising extruded polypropiolactone, wherein the film:
   (a) has a biocontent of at least about 60% (w/w);
   (b) is compostable up to 100%;
   (c) has a tensile modulus range between about 800 MPa and about 1100 MPa;
   (d) has a tensile strength at break range between about 25 MPa to about 35 MPa; or
   (e) has an elongation at break range of about 440% to about 660%, or any combination of (a)-(e).

7. The film of claim 6, wherein the polypropiolactone has an average molecular weight ($M_w$) between about 100,000 g/mol to about 200,000 g/mol.

8. The film of claim 6, wherein the polypropiolactone has an average molecular weight ($M_w$) between about 800,000 g/mol to about 1,000,000 g/mol.

9. The film of claim 5 for use as packaging material.

10. A method of producing acrylic acid from a bio-based and compostable film, comprising:
    providing a polypropiolactone film; and
    thermolyzing at least a portion of the polypropiolactone film to produce acrylic acid.

11. The method of claim 1, further comprising three or more polypropiolactone polymers having differing average molecular weight ($M_w$).

12. The method of claim 1, wherein the polypropiolactone polymers have a form of particles, and wherein the polypropiolactone polymers have a size of about 300 ppm to about 3,000 ppm so that the polypropiolactone polymers feed easily into an extruder.

13. The method of claim 1, wherein the step of blowing the mixture to form the film occurs at a temperature below 160 degrees Celsius so that the film is free of acrylic acid.

14. The method of claim 1, further comprising:
    thermolyzing at least a portion of the film at a temperature above 160 degrees Celsius to produce acrylic acid.

15. The method of claim 11, further comprising:
    producing polypropiolactone polymers from ethylene oxide and carbon monoxide, wherein the ethylene oxide and the carbon monoxide have a biocontent that is greater than 0% (w/w).

16. The film of claim 6, wherein the polypropiolactone has an average molecular weight ($M_w$) between about 120,000 g/mol and about 150,000 g/mol.

17. The film of claim 6, wherein the film has up to about 50% crystallinity.

18. The film of claim 6, wherein the film is substantially free of acrylic acid.

19. The method of claim 10, wherein the polypropiolactone film has a tensile modulus range between about 800 MPa and about 1000 MPa or has a tensile strength break range between about 25 MPa to about 35 MPa.

20. The method of claim 10, wherein the polypropiolactone film has an elongation at break between about 0.1% and about 1000%.

* * * * *

UNITED STATES PATENT AND TRADEMARK OFFICE
CERTIFICATE OF CORRECTION

| | |
|---|---|
| PATENT NO. | : 11,773,215 B2 |
| APPLICATION NO. | : 16/970736 |
| DATED | : October 3, 2023 |
| INVENTOR(S) | : Utpal Mahendra Vakil |

It is certified that error appears in the above-identified patent and that said Letters Patent is hereby corrected as shown below:

In the Claims

Column 8, Claim 15, Line 63, "claim 11" should be —claim 1—

Signed and Sealed this
Ninth Day of January, 2024

*Katherine Kelly Vidal*

Katherine Kelly Vidal
*Director of the United States Patent and Trademark Office*